(12) United States Patent
Novack

(10) Patent No.: US 8,117,917 B2
(45) Date of Patent: Feb. 21, 2012

(54) VIBRATING BEAM ACCELEROMETER WITH IMPROVED PERFORMANCE IN VIBRATION ENVIRONMENTS

(75) Inventor: Mitchell Novack, Kenmore, WA (US)

(73) Assignee: Honeywell International Inc., Morristown, NJ (US)

( * ) Notice: Subject to any disclaimer, the term of this patent is extended or adjusted under 35 U.S.C. 154(b) by 833 days.

(21) Appl. No.: 12/057,192

(22) Filed: Mar. 27, 2008

(65) Prior Publication Data

US 2009/0241665 A1 Oct. 1, 2009

(51) Int. Cl.
*G01P 15/10* (2006.01)

(52) U.S. Cl. .................. 73/514.29; 73/514.36

(58) Field of Classification Search ............... 73/514.23, 73/514.29, 514.36, 514.13, 514.16, 514.21, 73/514.32
See application file for complete search history.

(56) References Cited

U.S. PATENT DOCUMENTS

| | | | | |
|---|---|---|---|---|
| 4,182,187 A | * | 1/1980 | Hanson | 73/497 |
| 4,628,735 A | * | 12/1986 | Kirkpatrick | 73/514.29 |
| 4,926,689 A | * | 5/1990 | Hanson | 73/514.29 |
| 4,932,258 A | * | 6/1990 | Norling | 73/497 |
| 5,313,023 A | * | 5/1994 | Johnson | 177/229 |
| 5,379,639 A | * | 1/1995 | Hulsing et al. | 73/514.29 |
| 5,456,110 A | * | 10/1995 | Hulsing, II | 73/514.36 |
| 5,594,170 A | * | 1/1997 | Peters | 73/514.29 |
| 5,948,981 A | * | 9/1999 | Woodruff | 73/514.29 |
| 5,996,411 A | * | 12/1999 | Leonardson et al. | 73/514.29 |
| 6,230,565 B1 | * | 5/2001 | Foote | 73/514.29 |
| 6,453,744 B2 | * | 9/2002 | Williams | 73/504.12 |
| 6,662,658 B2 | * | 12/2003 | Foote | 73/514.29 |

* cited by examiner

*Primary Examiner* — Helen C. Kwok
(74) *Attorney, Agent, or Firm* — Lowe Graham Jones PLLC

(57) ABSTRACT

An accelerometer that has a cross coupling coefficient due to pendulum droop of the proof mass that is approximately equal and opposite in sign to a cross coupling coefficient due to resonator nonlinearity. The accelerometer includes a proof mass, a housing having at least two opposing interior walls, and one or more flexures for flexibly connecting the proof mass at a first end to a first one of the opposing walls of the housing. A first resonator is connected to a first surface of the proof mass at an end of the proof mass opposite the first end and to the housing wall that is not attached to the flexure. A second resonator is connected to a second surface of the proof mass and the housing wall that receives the first resonator. The second surface is on an opposite side of the proof mass as the first surface.

7 Claims, 2 Drawing Sheets

FIG. 1 *(PRIOR ART)*

VIBRATING BEAM ACCELEROMETER WITH IMPROVED PERFORMANCE IN VIBRATION ENVIRONMENTS

GOVERNMENT INTEREST

The invention described herein was made in the performance of work under U.S. Government Contract No. FA9453-05-C-0241. The Government Agency is Air Force Research Laboratories (AFRL). The Government may have rights to portions of this invention.

BACKGROUND OF THE INVENTION

Accelerometers used in guidance, navigation, and control systems, have to meet performance specifications in spite of structural and acoustic vibration environments. These systems typically output accelerometer values at relatively slow data rates, on the order of 100 Hz and slower. This is sufficient for aircraft navigation or missile guidance and control. Structural and acoustic vibrations, on the other hand, are typically much higher, in the 100 to 100,000 Hz range.

The average output from an accelerometer, taken over enough samples, would ideally be zero in a vibration environment as described above. The vibration environment being equally positive and negative in direction, with an average acceleration of zero, and no net change in velocity.

However, real accelerometers do not respond identically to positive and negative accelerations. That is, their output is not perfectly linear over the + and − range. As a result, their average output does not average to zero under vibration. Instead, they suffer a bias offset in vibration, an error that is referred to as vibration rectification error, or VRE. VRE is typically a significant problem for precision accelerometers in guidance, navigation, and control systems.

One source of accelerometer nonlinearity contributing to VRE is called cross coupling sensitivity. This refers to changes in the primary input axis sensitivity of the accelerometers as a function of cross axis accelerations. In particular, the cross coupling coefficient $K_{ip}$ (input axis sensitivity coupling with pendulous axis input) can be very large, and contributes significantly to nonlinearity and to VRE.

In pendulous vibrating beam accelerometers, the cross coupling coefficient $K_{ip}$ comes from two sources. First, the pendulum displaces under acceleration, causing the center of mass to move with respect to the supporting flexures or pivot. This causes a change in pendulous axis sensitivity, which then by definition is a cross coupling sensitivity $K_{ip}$. This source for $K_{ip}$ is typically referred to as pendulum droop.

A second source for $K_{ip}$ is from the nonlinear force-frequency relationship in the vibrating beam force sensor. (The terms "vibrating beam force sensor", "force sensor", and "resonator" are used interchangeably). Because of this nonlinearity, input axis accelerations change pendulous axis sensitivity, and vice versa, resulting in $K_{ip}$ by definition.

FIG. 1 shows a prior art vibrating beam accelerometer with the orientation of vibrating beam force sensors (resonators 34-1, 34-2) relative to the pendulous proof mass 30 attached to a structure and stable member 38 via flexure(s) 32, such that:

1) Droop $K_{ip}$ is positive. That is, for positive accelerations along an input axis 40, the angular droop of the pendulum will increase the sensitivity along a pendulous axis 42.

2) Vibrating beam $K_{ip}$ is also positive. That is, for positive accelerations along the pendulous axis 42, both resonators 34-1, 34-2 go into compression, which by the nonlinear force-frequency relationship of the resonator, will increase the input axis sensitivity.

In summary, $K_{ip}$ nonlinearity results in accelerometer bias errors in vibration environments (VRE). $K_{ip}$ in vibrating beam pendulous axis accelerometers is driven both by pendulum droop and by the nonlinear force-frequency behavior of the vibrating beam force sensor.

SUMMARY OF THE INVENTION

The present invention provides an accelerometer that has a cross coupling coefficient due to pendulum droop of the proof mass that is approximately equal and opposite in sign to a cross coupling coefficient due to resonator nonlinearity.

The accelerometer includes a proof mass, a housing having at least two opposing interior walls, and one or more flexures for flexibly connecting the proof mass at a first end to a first one of the opposing walls of the housing. A first resonator is connected to a first surface of the proof mass at an end of the proof mass opposite the first end and to the housing wall that is not attached to the flexure. A second resonator is connected to a second surface of the proof mass and the housing wall that receives the first resonator. The second surface is on an opposite side of the proof mass as the first surface.

In one aspect of the invention, the first and second resonators are tuning fork resonators.

BRIEF DESCRIPTION OF THE DRAWINGS

Preferred and alternative embodiments of the present invention are described in detail below with reference to the following drawings:

FIG. 1 is a cross-sectional view of a vibrating beam accelerometer (VBA) formed in accordance with the prior art;

FIG. 4-1 illustrates a plan top view of a vibrating beam accelerometer formed in accordance with an embodiment of the present invention;

FIG. 4-2 illustrates a plan bottom view of the VBA shown in FIG. 4-1; and

FIG. 4-3 illustrates a side view of the VBA shown in FIGS. 4-1 and 4-2.

DETAILED DESCRIPTION OF THE INVENTION

This invention eliminates or reduces the cross coupling coefficient $K_{ip}$ to reduce VRE and improve accelerometer performance in vibration environments.

This invention solves the above problem by canceling pendulum droop $K_{ip}$ with $K_{ip}$ from the vibrating beam force-frequency nonlinearity. These two sources for $K_{ip}$ are made to be opposite in sign by this invention and/or to be exactly equal and opposite to substantially cancel one another.

This invention is unique from prior art in the orientation of the vibrating beam force sensors relative to the pendulous proof mass and unique in the specific sizing of the proof mass and flexure support system relative to the vibrating beam force sensors. The orientation allows for the droop $K_{ip}$ to be opposite in sign from the vibrating beam $K_{ip}$. The sizing relationship allows the two error terms to exactly cancel.

Figure 2:
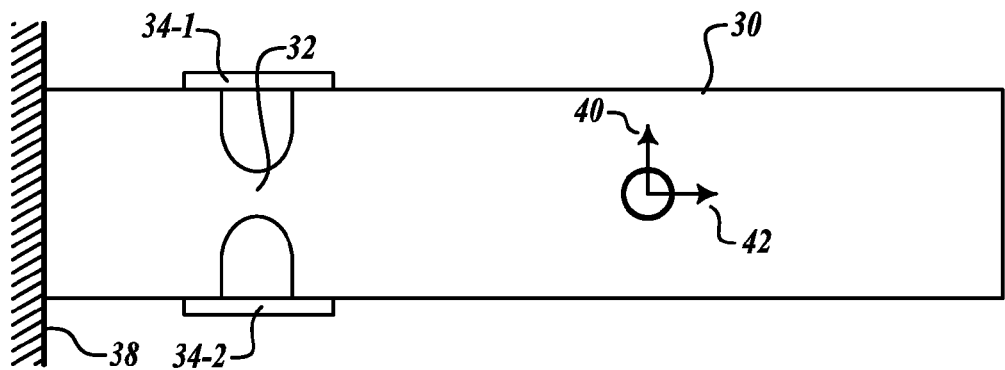
FIG. 2 illustrates a cross-sectional view of a vibrating beam accelerometer formed in accordance with an embodiment of the present invention.
Figure 2:
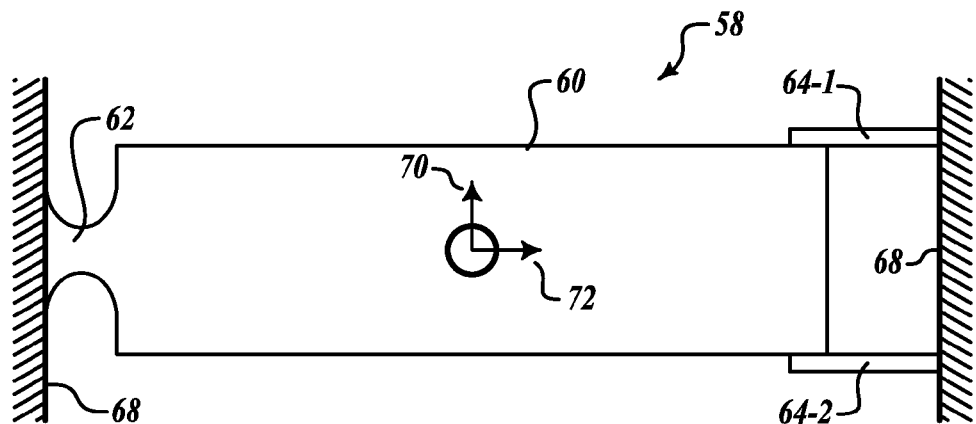

FIG. 2 illustrates a side-view of an example vibrating beam force sensor 58. The sensor 58 includes a proof mass 60, one or more flexures 62, and at least two resonators 64-1, 64-2. The flexures 62 are attached at one end to a first wall of a housing 68 and at the other end to a first end of the proof mass 60. A first one of the resonators 64-1 is attached between another wall of the housing 68 and a first side of the proof mass 60 at a second end that is opposite the first end. The second resonator 64-2 is also connected to the same wall of the housing 68 as that of resonator 64-1, but is connected to a second side of the proof mass 60 at the second end of the proof mass 60. The second side is opposite and parallel to the first side of the proof mass 60, both sides being approximately perpendicular to the walls of the housing 68. The flexures 62 allow the proof mass 60 to deflect along an input axis 70. A pendulous axis 72 is perpendicular to the input axis 70 along the longitudinal axis of the proof mass 60.

Figure 3:
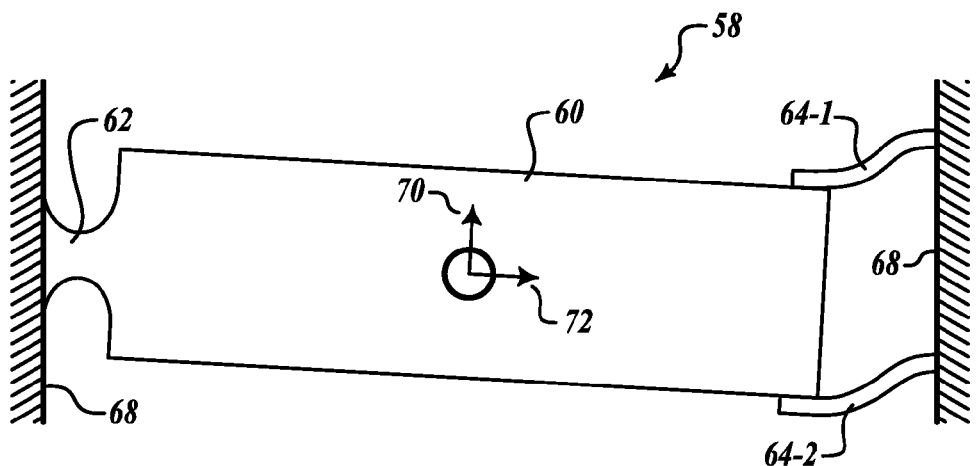
FIG. 3 illustrates the vibrating beam accelerometer of FIG. 2 after an acceleration force is applied.

FIG. 3 shows deflection of the proof mass 60 when experiencing a force along the input axis 70. The resonators 64-1, 64-2 deflect accordingly, with 64-1 put into compression and 64-2 into tension, thus causing a change in frequency. A device not shown receives signals that are sent by the resonators 34-1, 34-2 and determines their frequency and any changes in their frequency. The determined frequencies are used to determine force experienced.

In this invention, the resonators (64-1, 64-2) are oriented relative to the pendulous proof mass 60, such that:

1) Droop $K_{ip}$ is still positive; and
2) Positive accelerations (motion of housing to right on page) along the pendulous axis 72 puts both resonators 64-1, 64-2 into tension, and by the nonlinear force-frequency relationship of the resonator, will decrease the input axis sensitivity, resulting in a negative $K_{ip}$.

In order for the two $K_{ip}$ errors to exactly cancel, the following design relationships must be maintained in addition to orienting the resonators 64-1, 64-2 as described above:

1) $K_{ip}$ from pendulum droop is calculated as the angular displacement of the proof mass center of gravity relative to the flexure hinge center of rotation, for 1 G input axis acceleration; and
2) $K_{ip}$ from resonator nonlinearity is calculated by $K_{ip}=2K_p K_2$, where $K_p$ and $K_2$ are for individual resonators; and $K_p$ is the pendulous axis sensitivity and $K_2$ is the second order input axis sensitivity.
3) The above calculations are made by structural analysis methods, typically involving finite element analysis or other suitable methods.

The design is adjusted until the two Kip error sources are equal and opposite in sign so as to cancel one another.

Derivation of $K_{IP}$ from Resonator Nonlinearity

Derivation of the equations for Kip due to resonator nonlinearity is as follows:

$$f = fo[1 + a_1 \cdot F_c + a_2 \cdot (F_c)^2] \tag{1}$$

Equation (1) is a polynomial approximation of resonator frequency vs. force. $F_c$ is axial force on resonator. $a_1$ and $a_2$ are functions of the resonator geometry and material properties.

$$f - fo = (fo \cdot a_1 \cdot B_i) \cdot A_i + (fo \cdot a_1 \cdot B_p) \cdot A_p + fo \cdot a_2 \cdot (B_i \cdot A_i + B_p \cdot A_p)^2 \tag{2}$$

$$f - fo = (fo \cdot a_1 \cdot B_i) \cdot A_i + (fo \cdot a_1 \cdot B_p) \cdot A_p + fo \cdot a_2 \cdot [(B_i)^2 \cdot (A_i)^2 + 2 B_i \cdot B_p \cdot A_i \cdot A_p + (B_p)^2 \cdot (A_p)^2] \tag{3}$$

Figures 1, 4:
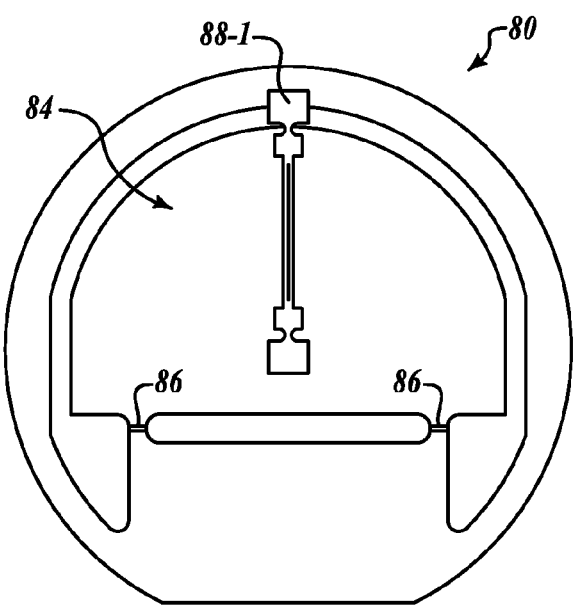
Figures 2, 4:
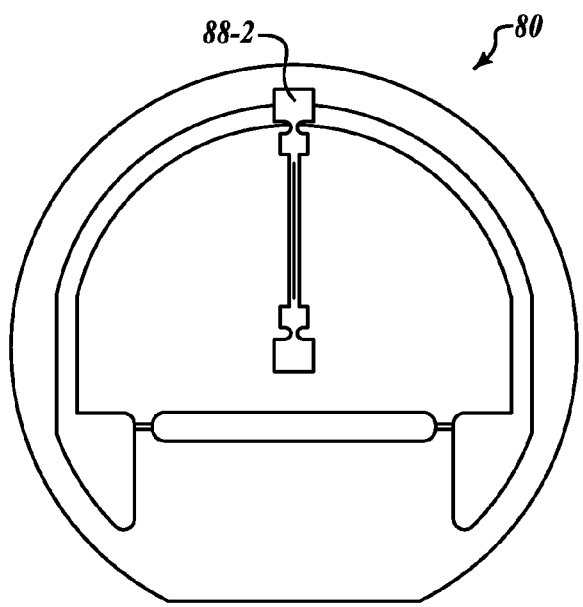
Figures 3, 4:
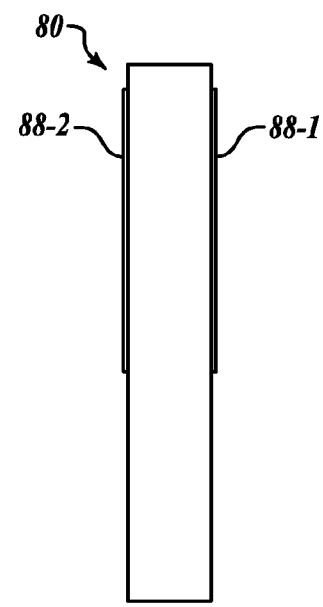

$B_i$ is a function of proof mass and hinge geometry and material properties. $B_i$ relates accelerations along the input axis, $A_i$, to resonator force, with units, for example, of Newtons per G. For example, in FIGS. 4-1 through 4-3, the diameter of 80 is 1.7 inches, and the thickness is 0.25 inches. flexures 86 are 0.050 inches by 0.020 inches by 0.003 inches thick. In this case, Bi is approximately 0.1 Newtons per G.

$B_p$ similarly relates accelerations along the pendulous axis, $A_p$, to resonator forces.

Let $$SF = fo \cdot a_1 \cdot B_i \tag{4}$$

Equation (4) is the scale factor in Hz/g.

$$\frac{f - fo}{SF} = A_{ind} = A_i + \frac{B_p}{B_i} \cdot A_p + \frac{a_2}{a_1} \cdot \left[ \begin{array}{l} B_i \cdot (A_i)^2 + 2 \cdot B_p \cdot \\ A_i \cdot A_p + \frac{(B_p)^2}{B_i} \cdot (A_p)^2 \end{array} \right] \tag{5}$$

Let $K_p = \frac{B_p}{B_i}$ (6)

Equation (6) is cross axis sensitivity (single resonator sensitivity).

Let $$K_2 = \frac{a_2}{a_1} \cdot B_1 \tag{7}$$

Equation (7) is the second order input axis nonlinearity (single resonator sensitivity).

Let $$K_{pp} = \frac{(B_p)^2}{B_i} \tag{8}$$

Equation (8) is second order pendulous axis nonlinearity (single resonator sensitivity).

$$\frac{f - fo}{SF} = \tag{9}$$
$$A_{ind} = A_i + K_p \cdot A_p + K_2 \cdot (A_i)^2 + 2 \cdot K_p \cdot K_2 \cdot A_i \cdot A_p + K_{pp} \cdot (A_p)^2$$

$$K_{ip} = 2 \cdot K_p \cdot K_2 = 2 \cdot \frac{a_2}{a_1} \cdot B_p \tag{10}$$

Equation (10) is $K_{ip}$ from the force sensor nonlinearity.

To derive $K_{ip}$ from pendulum droop:

$$f = fo(1 + a_1 \cdot F_c) \tag{11}$$

Equation (11) is polynomial approximation of resonator frequency vs. force. The second order terms are not necessary to show cross-coupling from pendulum droop.

$F_c$ is axial force on resonator. $a_1$ is a function of the force resonator geometry and material properties.

$$f - fo = (fo \cdot a_1 \cdot B_i) \cdot A_i + (fo \cdot a_1 \cdot B_p) \cdot A_p + (fo \cdot a_1 \cdot B_{ip}) \cdot A_i \cdot A_p \tag{12}$$

$B_i$ is a function of proof mass and hinge geometry and material properties. $B_i$ relates accelerations along the input axis, $A_i$, to resonator force.

$B_p$ similarly relates accelerations along the pendulous axis, $A_p$, to resonator forces.

$B_{ip}$ relates accelerations along an axis that includes components of both the input and pendulous axes.

Let $$SF = fo \cdot a_1 \cdot B_i \tag{13}$$

Equation (13) is the scale factor in Hz/g.

$$\frac{f - f_O}{SF} = A_{ind} = A_i + \frac{B_p}{B_i} \cdot A_p + \frac{B_{ip}}{B_i} \cdot A_i \cdot A_p \quad (14)$$

$$K_{ip} = \frac{B_{ip}}{B_i} \quad (15)$$

This is the $K_{ip}$ coefficient from droop.
The two sources for $K_{ip}$ will cancel when:

$$2 \cdot \frac{a_2}{a_1} \cdot B_p + \frac{B_{ip}}{B_i} = 0 \quad (16)$$

$$\frac{B_{ip}}{B_i \cdot B_p} = -2 \cdot \frac{a_2}{a_1} \quad (17)$$

The B's are functions of the proof mass geometry and material properties. The a's are functions for the resonator geometry and material properties. These are best determined using finite element analysis, or other methods of mechanical analysis.

FIGS. 4-1, 4-2, 4-3 illustrate various views of an exemplary accelerometer 80 formed in accordance with the modeling described above. The accelerometer 80 includes a housing that has a pendulous proof mass 84 attached to a stable outer ring of the housing via flexures 86. Top and bottom resonators 88-1, 88-2 are connected between the proof mass 84 and the housing on an opposite side of the housing as where the flexures are connected. In one embodiment the resonators 88-1, 88-2 are double-ended tuning forks.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making an accelerometer comprising:
  a) generating a model of an accelerometer with flexures that flexibly connect a proof mass at a first end to a first one of opposing walls of a housing, a first resonator attached to a first surface of the proof mass at an end of the proof mass opposite the first end of the proof mass and to a housing wall that is not attached to the flexure, a second resonator attached to a second surface of the proof mass and the housing wall that receives the first resonator;
  b) calculating $K_{ip}$ from pendulum droop as the angular displacement of a center of gravity of the proof mass relative to a center of rotation of the flexures for 1G input axis acceleration;
  c) calculating $K_{ip}$ from resonator nonlinearity;
  d) repeating (a-c) with one or more adjusted features until the two $K_{ip}$ values calculated are equal and opposite in sign;
  based on the adjusted features,
    providing a housing comprising at least two opposing interior walls;
    forming a proof mass and one or more flexures that flexibly connect the proof mass at a first end to a first one of the opposing walls of the housing;
    attaching a first resonator to a first surface of the proof mass at an end of the proof mass opposite the first end of the proof mass and to the housing wall that is not attached to the flexure; and
    attaching a second resonator to a second surface of the proof mass and the housing wall that receives the first resonator,
    wherein the second surface is on an opposite side of the proof mass as the first surface.

2. The method of claim 1, wherein the first and second resonators are tuning fork resonators.

3. The method of claim 1, wherein a cross coupling coefficient due to pendulum droop of the proof mass is approximately equal and opposite in sign to a cross coupling coefficient due to resonator nonlinearity.

4. The method of claim 1, wherein calculating $K_{ip}$ from resonator nonlinearity is $2K_p K_2$, where $K_p$ is pendulous cross axis sensitivity and $K_2$ is second order input axis sensitivity.

5. The method of claim 4, wherein $K_p$ is a relation of acceleration along a pendulous axis to resonator force divided by a function of proof mass, hinge geometry and material properties.

6. The method of claim 5, wherein the function of proof mass, hinge geometry and material properties is approximately 0.1 Newtons per gravity.

7. The method of claim 1, wherein calculating $K_{ip}$ from pendulum droop comprises acceleration values along an axis with components of the input and pendulous axes divided by a function of proof mass, hinge geometry and material properties.

\* \* \* \* \*

UNITED STATES PATENT AND TRADEMARK OFFICE
CERTIFICATE OF CORRECTION

| | |
|---|---|
| PATENT NO. | : 8,117,917 B2 |
| APPLICATION NO. | : 12/057192 |
| DATED | : February 21, 2012 |
| INVENTOR(S) | : Mitchell Novack |

It is certified that error appears in the above-identified patent and that said Letters Patent is hereby corrected as shown below:

Specification, col 1, line 10: "The Government may have rights" should be changed to -- The Government has certain rights --.

Signed and Sealed this
Twenty-sixth Day of April, 2016

Michelle K. Lee
*Director of the United States Patent and Trademark Office*